United States Patent
Staines et al.

(10) Patent No.: US 12,465,036 B2
(45) Date of Patent: Nov. 11, 2025

(54) APPARATUS FOR RESTRAINING FISHING RODS

(71) Applicants: Christopher Jay Staines, Overland Park, KS (US); Landon Jay Staines, Overland Park, KS (US)

(72) Inventors: Christopher Jay Staines, Overland Park, KS (US); Landon Jay Staines, Overland Park, KS (US)

(*) Notice: Subject to any disclaimer, the term of this patent is extended or adjusted under 35 U.S.C. 154(b) by 0 days.

(21) Appl. No.: 18/513,822

(22) Filed: Nov. 20, 2023

(65) Prior Publication Data

US 2024/0172734 A1 May 30, 2024

Related U.S. Application Data

(60) Provisional application No. 63/385,049, filed on Nov. 28, 2022.

(51) Int. Cl.
*A01K 97/10* (2006.01)

(52) U.S. Cl.
CPC .................... *A01K 97/10* (2013.01)

(58) Field of Classification Search
CPC ...................................................... A01K 97/10
See application file for complete search history.

(56) References Cited

U.S. PATENT DOCUMENTS

| | | | |
|---|---|---|---|
| 3,074,197 A * | 1/1963 | Schnars | A01K 97/10 248/518 |
| 3,484,066 A * | 12/1969 | Aunspaugh | A01K 97/10 248/541 |
| 3,832,796 A * | 9/1974 | Cardwell | A01K 97/10 24/546 |
| 4,551,939 A | 11/1985 | Kitchens | |
| 4,901,469 A | 2/1990 | Murray | |
| 5,557,877 A | 9/1996 | Colson | |

(Continued)

OTHER PUBLICATIONS

Millennium Marine, R-300 Rod Transport Rack—R-300 Rod Transport Rack—https://millennium-outdoors.com/product/rod-transport-rack/?v=7516fd43adaa—Aug. 28, 2025.
Tackle Direct, TackleDirect, SeaSucker 5061 Horizontal Rod Holders, SeaSucker, https://www.tackledirect.com/seasucker-5061-horizontal-rod-holders.html?gclid=EAIaIQobChMIq-fJgt2c-wlVvvzjBx2DeAlcEAQYAyABEgL1wPD_BWE—Aug. 28, 2025.
Summit Pole Boat Mount, SummitFishing, https://summitfishingequipment.com/products/summit-pole-boat-mount, Aug. 28, 2025.

(Continued)

*Primary Examiner* — Christopher D Hutchens
(74) *Attorney, Agent, or Firm* — Lathrop GPM LLP; Robert J. Lambrechts (57) ABSTRACT

An apparatus for restraining fishing rods that includes a base member and a pair of plate members. The apparatus also includes a plurality of clamps arranged for restraining a plurality of fishing poles wherein the clamps are mounted to the plate members. The apparatus includes a first ball and a second ball with a mounting member that extends outwardly from the bottom surface of the base member. A main housing member with an upper portion and a lower portion is operable to restrain movement of the main housing about the first ball. A second ball also with a mounting member is rotatably restrained within the lower portion of the main housing member. Finally, a lever arm extends outwardly from the housing member. The lever arm is operable to threadedly increase or decrease compression upon both balls as well as manually rotate the housing member, base member, and pair of plate members to a desired orientation.

14 Claims, 5 Drawing Sheets

(56) References Cited

U.S. PATENT DOCUMENTS

| | | | | |
|---|---|---|---|---|
| 6,651,374 | B1* | 11/2003 | Ridlen | A01K 97/10 248/514 |
| 7,530,324 | B2 | 5/2009 | Salerno | |
| 11,185,062 | B1 | 11/2021 | Zimmerman | |
| 2007/0187447 | A1* | 8/2007 | Hamann | A01K 97/08 224/520 |
| 2015/0359210 | A1 | 12/2015 | Rossi | |
| 2019/0045922 | A1 | 2/2019 | Jacobs | |
| 2020/0037594 | A1* | 2/2020 | Lohmeier | A01K 97/10 |
| 2021/0161117 | A1 | 6/2021 | Rouse et al. | |
| 2022/0134961 | A1* | 5/2022 | Gwinn | B60R 9/08 211/70.8 |

OTHER PUBLICATIONS

BoatBuckle, BoatBuckle F15435 Imco Hold Down Vertical Rod black, Medium, Amazon, https://www.amazon.com/BoatBuckle-F15435-IMCO-Hold-Vertical/dp/B000KKB50E/ref=asc_df_B000KKB50E/?tag=hyprod-20&linkCode=df0&hvadid=312061152211&hvpos=&hvnetw=g&hvrand=4185695788345971608&hvpone=&hvptwo=&hvqmt=&hvdev=c&hvdvcmdl=&hvlocint=&hvlocphy=9021768&hvtargid=pla-.

BoatOutfitters, 4-rod Deluxe Fishing Rod Holder Rack White, Boat Outfitters, https://www.boatoutfitters.com/4-rod-deluxe-fishing-rod-holder-rack-white, Aug. 28, 2025.

\* cited by examiner

APPARATUS FOR RESTRAINING FISHING RODS

RELATED APPLICATION

This application claims priority from U.S. Provisional Patent Application No. 63/385,049 filed Nov. 28, 2022. The contents of that application are incorporated herein by reference in its entirety.

FIELD OF THE DISCLOSURE

This disclosure is directed to an apparatus for restraining one or more fishing rods to a rigid surface, such as the deck of a boat, and to maximize standing space on the deck.

BACKGROUND

Bass boats are specifically designed for fishing in fresh water such as lakes, rivers, and streams. These boats are powered by an outboard motor with a high horsepower-to-weight ratio ranging up to 300 HP which improves the performance on the water and widens its scope for competitive and professional angling activities. Further, the availability of bass boats in various sizes coupled with its lightweight and extensive range of power makes it a preferred choice for freshwater fishing. Such factors are encouraging the sales of bass boats globally.

The National Marine Manufacturers Association (NMMA) has estimated a strong growth of boat sales in the United States, which in turn, is expected to propel the growth of bass boat market in the region. Moreover, bass boats are used extensively in freshwater and more than 60% of the fishing in the United States is done in freshwater which strengthens the demand for the bass boat market. Such positive demand for fishing boats in this region is foreseen to strengthen the demand for the bass boat, thereby offering lucrative opportunities for the bass boat manufacturers. In 2019, there were around 280,000 boats sold in the United States accounting for nearly 2.2% of the country's GDP while more than 310,000 new powerboats were sold in 2020. This is a level the recreational boating industry has not seen since before the Great Recession in 2008.

An estimated 100 million Americans go boating each year and according to U.S. Coast Guard data sixty-one percent of boaters have an annual household income of $75,000 or less. The NMMA noted that ninety-five percent of boats on the water in the U.S. are less than 26 feet—boats that can be trailered by a vehicle to local waterways. These are important statistics in that boats are an expensive investment with prices ranging from $20,000 up to $75,000 and beyond. The factors that affect the big gap between prices are the boat's size, length, and brand. Most bass boats are between 16-22 feet in length. Beginners may settle for small bass boats that are around 18 feet long. They are ideal for use at a nearby lake when fishing with a friend or two. A larger boat may be needed when the boat owner intends to use it with more than two or possibly three individuals fishing off the bass boat.

A reasonable estimate is that newer boats increase in cost at a rate of at least $10,000 per foot of overall length of the boat. Consequently, the cost of deck space becomes very pricey as the overall length of the boat increases. Deck space on bass boats is critical as that is where those who are doing the fishing stand for casting and reeling in the fish.

The smaller the boat the less deck space is available for individuals to stand. Moreover, it is not uncommon for bass fisherman to utilize multiple fishing rods during any outing. Different rods have different capacities and will often be paired with specialized bait to attract fish in certain environments such as near the shore or in congested fishing areas. Most fisherman will lay out their fishing rods upon the deck of the boat side-by-side one another where they are at the ready for service as the fisherman deems necessary to retrieve them. For example, five fishing rods consume a total of about 8-10 square feet of deck space. A typical smaller fishing boat in the 16-to-17-foot range has roughly 25 square feet of deck space and a 21-foot fishing boat has about 40 square feet of space. Consequently, the savings of 10 square feet of deck space by utilization of the disclosed apparatus represents additional deck space available for use by the fisherman.

With two fisherman and two sets of rods occupying the limited deck space the bow or stern of the boat can quickly become undesirably crowded. The deck space can become potentially unsafe because of a potential fishing rod tripping hazard resulting in a man-overboard scenario. Even a conscientious fisherman that is highly respectful of the other fisherman may inadvertently step upon and damage her shipmates fishing rods that are splayed next to one another upon the deck. Such mishaps can result in damage to expensive rods or the loss of rods that are unintentionally kicked off the deck and into the water. These mishaps are oftentimes the result of insufficient deck space because the fisherman's feet have little room to move. Also, a problem is when heavy surf or a rogue wave can cause one or both of the fisherman to attempt to stabilize themselves with a foot landing upon the splayed rods thereby damaging them. Other devices that hold fishing rods are commercially available; however, they do not provide ready access to the rods that are clamped in place as with the present disclosure. Other devices also do not elevate the rods off of the deck so that a fisherman's feet may be positioned beneath the rods thereby increasing the usable deck space. Lastly, as will be discussed in additional detail below, the disclosed apparatus can readily be transferred to a storage area, e.g., a garage, with the rods already secured in position.

What is needed is a way to increase the available space upon the deck of a bass boat. Providing each fisherman with an additional square footage could potentially alleviate many challenges.

SUMMARY OF THE INVENTION

As previously noted, the National Marine Manufacturers Association has estimated a strong growth in bass boat sales in the United States. With bass boats ranging in price from above $20,000 and exceeding $75,000 and the price of a bass boat substantially increasing with each additional foot of overall length, it is becoming increasingly difficult for boat owners to purchase a boat with the requisite deck space to accommodate their style of fishing. As also previously noted, the household income of most individuals purchasing a bass boat does not exceed $75,000 so an alternative, less costly means of increasing deck space would meet with resounding demand from the marketplace.

The apparatus as disclosed herein is utilized for restraining one or more fishing rods out of the way of those utilizing the deck of a bass boat. The apparatus includes a base with an upper surface and a lower surface as well as a plurality of clamps that lock the rods into position upon opposed plate members. It is also contemplated that clamps could be secured such that they are facing downward, and fishing rods could be retained in position beneath the plate members as well as atop each plate member thereby increasing the capacity of the apparatus to secure rods. The clamps are mounted to the upper surface of the plate members and generally two spaced apart clamps secure one fishing rod in position onto the plate members which are supported by the base. The apparatus also includes a first ball with a mounting member. The mounting member extends outwardly from the bottom surface of the base with the first ball disposed opposite of the mounting member. An upper surface of the mounting member is secured to the bottom surface of the base.

The apparatus further includes a main housing member with an upper portion and a lower portion. The upper portion of the main housing member partially encircles or encloses the first ball capturing it in place but allowing the ball to rotate within the housing member.

The apparatus also includes a second ball with a mounting member. The mounting member of the second ball is mounted to the boat, either at the deck level (on a horizontal surface) or possibly to a side rail (canted to one side) that is slotted. The second ball is rotatably restrained within the lower portion of the main housing member.

To orient the apparatus a lever arm extends outwardly from roughly a center portion of the housing member. The lever arm is operable to threadedly, by rotation of a handle at the distal end of the lever, to increase or decrease compression upon the first and second balls within the housing. The lever arm at the proximal end threadedly engages with a hex nut that is captured in a lesser housing within the main housing. As the lever arm is rotated it either draws down on the hex nut in the lesser housing driving the two halves of the main housing together and increasing the compression on the first and second balls. The lever arm may also be rotated in the opposite direction thereby decreasing the compression on the first and second balls.

Another important feature of the apparatus is the ability to reorient the base as well as the main housing with the assistance of the lever. The long lever arm provides sufficient mechanical advantage to allow the user to easily rotate the housing atop the second ball and to position the base and clamps in a desired orientation.

It is an object of the apparatus disclosed herein to provide a platform upon which to securely restrain at least one fishing rod above the deck of a boat.

It is a further object of the apparatus disclosed herein to provide sufficient clearance between the deck of the boat and the lower surface of the base to allow the foot of a fisherman to be predominantly unobstructed beneath the base.

It is a further object of the apparatus disclosed herein to provide the user with considerable capacity to orient as desired the base with at least one fishing rod clamped securely to the apparatus to maximize available space upon the deck of the boat.

It is a further object of the apparatus disclosed herein to restrain the at least one fishing rod securely onto the base so that rod release during transit does not occur without manual intervention by a user.

It is a further object of the apparatus disclosed herein to allow quick and easy disconnection from the boat for storage of the at least one fishing rod off the boat in a storage area.

It is a further object of the apparatus disclosed herein to provide for connection to a boat at multiple locations such as proximate the bow and stern of the boat.

It is a further object of the apparatus to establish this as an element of future fishing boat design in order to allow factory installed hardware that may be utilized to increase the usable square footage of the deck area of a boat.

The contents of this summary section are provided only as a simplified introduction to the disclosure and are not intended to be used to limit the scope of the appended claims.

DETAILED DESCRIPTION

The following description is of various exemplary embodiments only, and is not intended to limit the scope, applicability, or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

Figure 1:
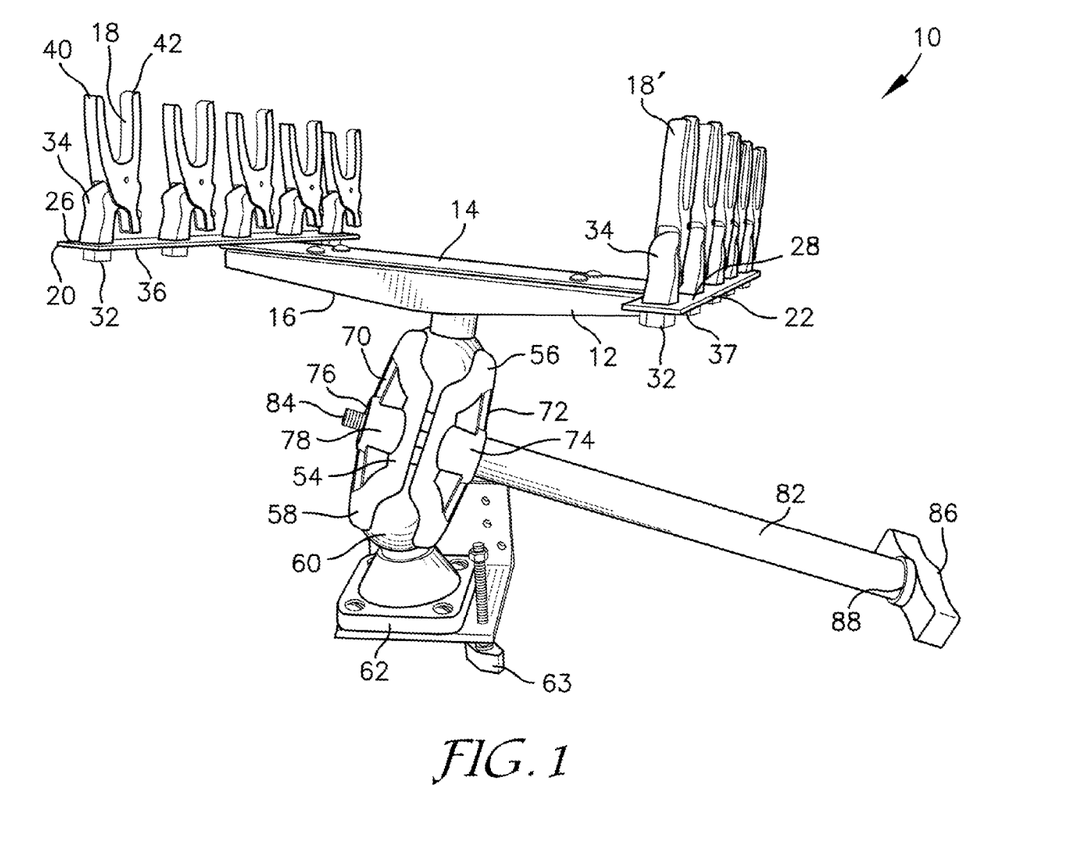
FIG. 1 illustrates a perspective view of an embodiment of the apparatus.

The fishing rod restraining apparatus 10 as illustrated at FIG. 1, includes a base 12 with an upper surface 14 and a lower surface 16 as well as a plurality of clamps 18, 18' mounted to two opposed plate members 20, 22. The clamps 18, 18' are preferably adjustable in their ability to restrain the retained fishing rods, potentially based upon sea state, and therefore a mechanism to adjust their holding power is contemplated by this disclosure. The base 12 and plate members 20, 22 are fabricated from members of sufficient structural rigidity to withstand the rigors of the application such as an engineered polymer, metal such as aluminum, steel or a composite material. The base 12 and plate members 20, 22 are preferably corrosion resistant and capable of withstanding moderate forces such as those applied from inadvertent manipulation such as from being stepped upon. An alternative embodiment may include individual tubular or planar members that are joined together in such a manner as to provide a rigid member. Such a member is preferably fabricated from a wide variety of materials to include engineered polymers, composites, and metals such as aluminum.

Figure 3:
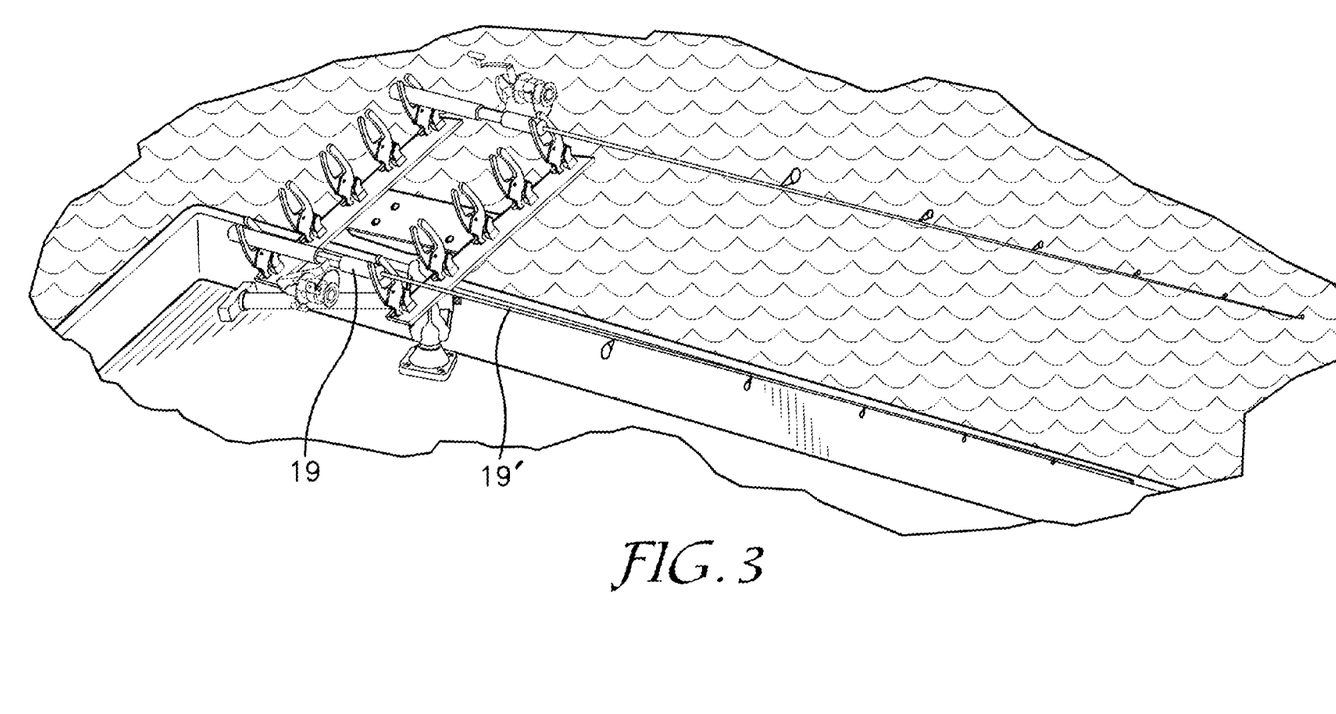
FIG. 3 illustrates a perspective view of an embodiment of the second ball of the apparatus mounted to a deck surface.

As illustrated at FIG. 1, the clamps 18, 18' are mounted to the upper surfaces 26, 28 of the plate members 20, 22 and generally two oppositely disposed spaced apart clamps 18, 18' secure each fishing rod 19 in position onto the plate members 20, 22. The clamps 18 are preferably mounted atop the upper surfaces 26, 28 of the plate members 20, 22 and secured to the plate members by one or more threaded fasteners 32 passing into a clamp mounting element 34 from the lower surfaces 36, 37 of the plate members 20, 22. Numerous commercially available clamps are capable of providing the necessary fishing rod 19 holding power in such a tightly constrained area. A preferred clamp 18 configuration includes two spring loaded fingers 40, 42 that grasp the blank 19' of a fishing rod 19 and securely hold it in position, as best illustrated at FIG. 3.

In a preferred embodiment, the plate members 20, 22 each carry five clamps 18, 18'; however, the number of clamps 18, 18' per apparatus 10 is not constrained by this disclosure and it is contemplated that a greater or lesser number of clamps could be utilized depending upon the needs of the ultimate user.

Figure 2:
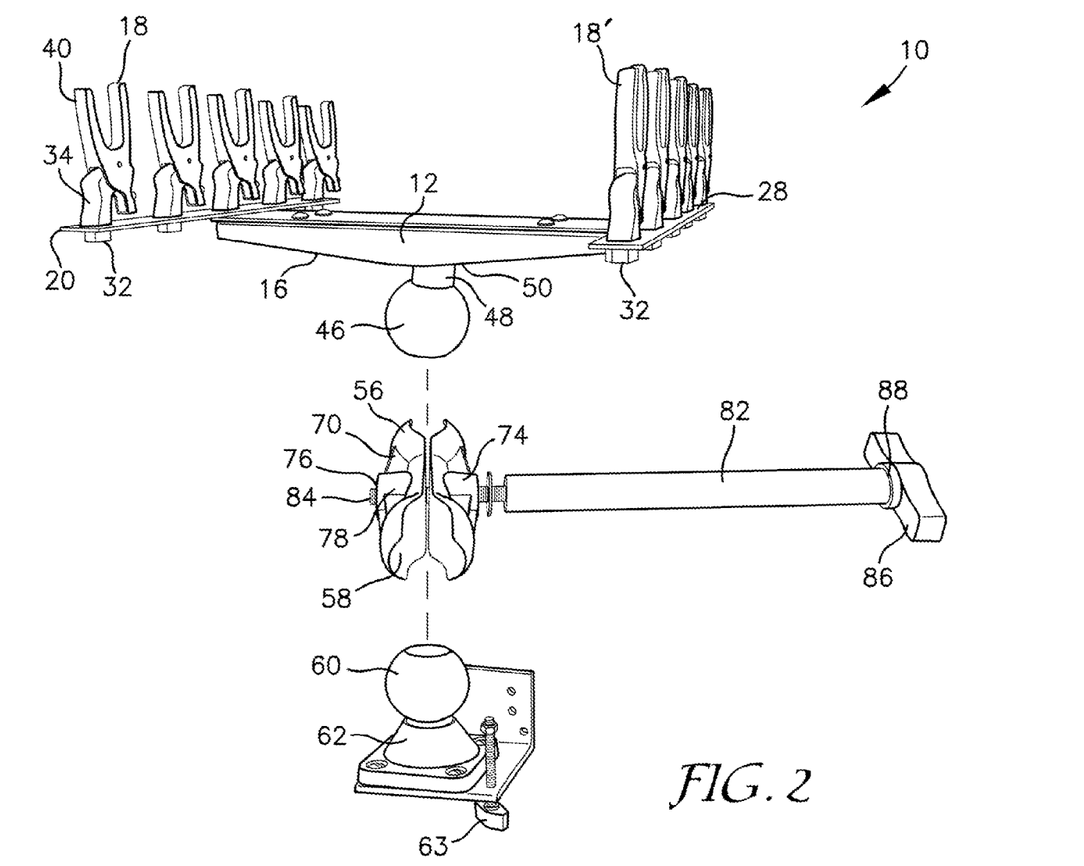
FIG. 2 illustrates another perspective view of the separate components of an embodiment of the apparatus.

As illustrated at FIG. 2, the disclosed apparatus 10 also includes a first ball 46 with a mounting member 48. The mounting member 48, as illustrated at FIG. 2 extends downwardly from the lower surface 16 of the base 12 with the first ball 46. It is also contemplated that that the mounting member 48 and first ball 46 may not always be extending downwardly from the lower surface 16 of the base 12 as the use of the apparatus 10 may dictate another orientation. An upper surface 50 of the mounting member 48 is secured to the bottom surface 16 of the base 12 optionally by threaded fastener (not shown) or welding of the mounting member 48 to the lower surface 16.

Figure 2A:
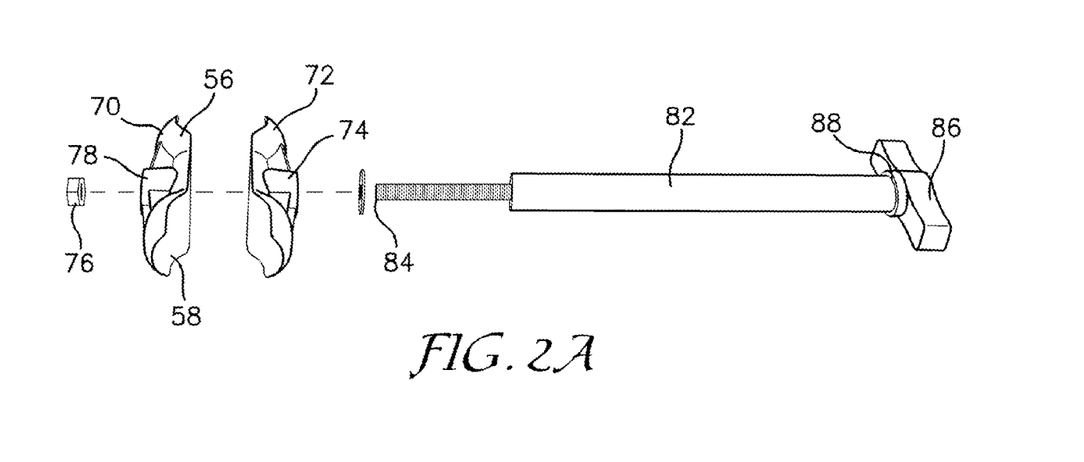
FIG. 2A illustrates an exploded view of the lever arm and main housing of the apparatus.

As illustrated at FIGS. 1, 2 and 2A, the apparatus 10 also includes a main housing 54 with an upper portion 56 and a lower portion 58. The main housing 54 as with the first ball 46 is preferably fabricated from an engineered polymer, composite or a metal that is corrosion resistant, has high strength, good abrasion resistance and is light weight. The upper portion 56 of the main housing 54 partially encircles or encloses the first ball 46 capturing it in place; however, the capture is preferably not so tight as to prevent the upper portion 56 of the main housing 54 from rotating on the ball 46 when an appropriate level of force is applied. An exemplary main housing 54 with upper and lower portions 56, 58 is commercially available from a wide range of commercial entities.

Figure 4:
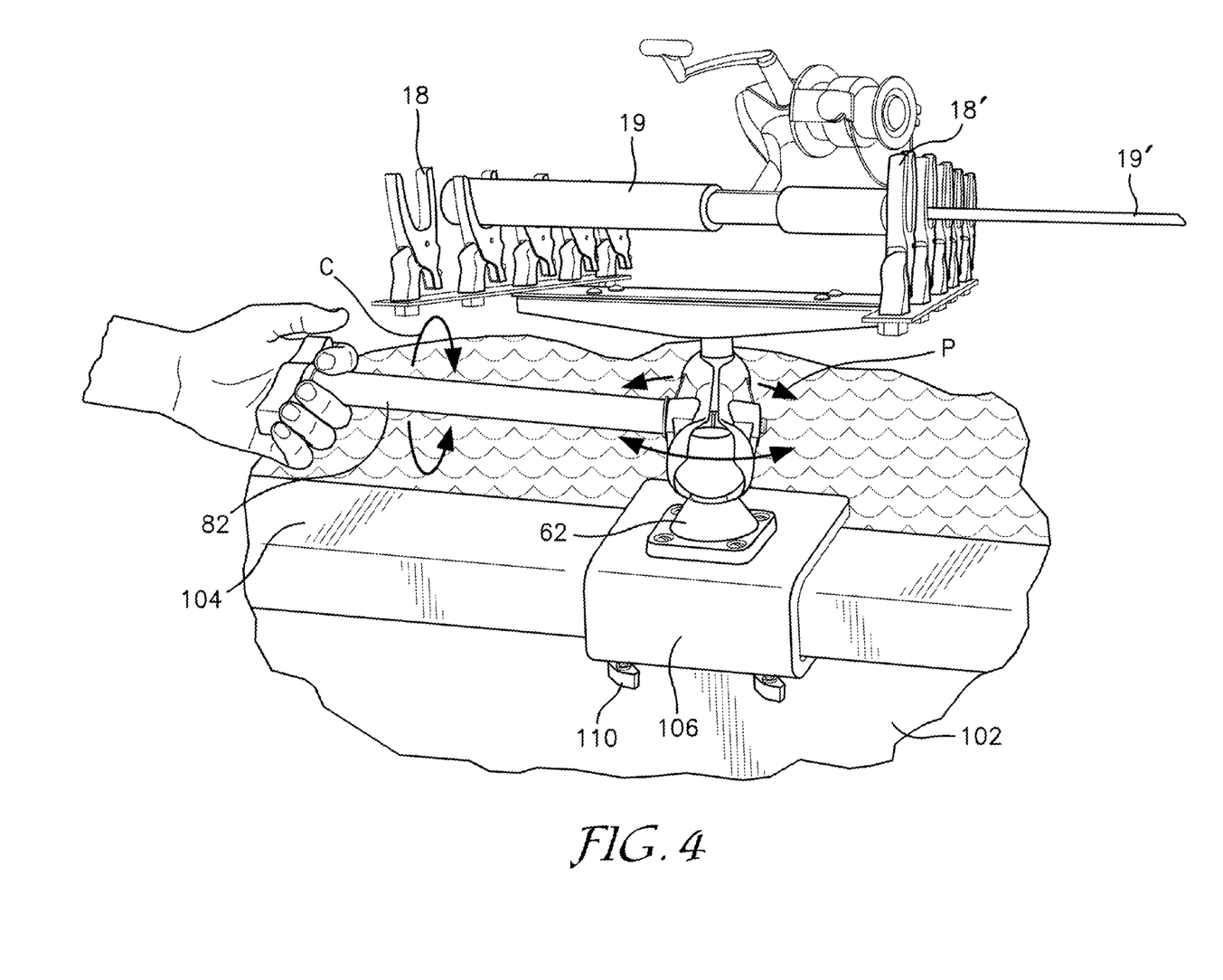
FIG. 4 illustrates a perspective view of an embodiment of the apparatus releasably mounted to a boat rail.

The apparatus 10 also includes a second ball 60 with a mounting member 62. The second ball 60 is also preferably fabricated from an engineered polymer, composite or corrosion resistant metal. The mounting member 62 of the second ball 60 is mounted to the boat or surface of a structure, for example, either at the deck or transom or possibly to a slotted side rail as illustrated at FIGS. 3 and 4. The second ball 60 is rotatably restrained within the lower portion 58 of the main housing 54. The lower portion 58 is also preferably not so tightly restrained as to prevent rotation about the second ball 60 such that the main housing 54 cannot be manually rotated or pivoted as is discussed in greater detail in the following paragraphs.

As FIGS. 2 and 2A illustrate, the main housing 54 is a two-piece member including a first housing member 70 and a second housing member 72. Disposed between the upper portion 56 and the lower portion 58 is a central portion 74. The central portion 74 spans through both the first and second housing members 70, 72 and includes a minor housing 78 in the first housing member 70 where a fastener 76, preferably threaded, resides and prevents rotation of the fastener 76. An exemplary fastener 76 for placement in the minor housing 78 is a hex headed nut. The prevention of rotation of the fastener 76 is a critical function of the minor housing 78.

As FIGS. 1, 2 and 2A illustrate, a lever arm 82 extends outwardly from the central portion 74 of the main housing 54. The lever arm 82 is inserted into an opening in the second housing member 72. The lever arm 82 includes a threaded distal end 84 and a handle 86 at the proximal end 88 of the lever 82. The distal end 84 of the lever arm 82 passes through the second housing member 72 and threadedly engages with the fastener 76 in the minor housing 78 located in the first housing member 70. A preferred embodiment of the lever arm 82 is fabricated from a rigid material such as an engineered plastic, corrosion resistant metal or possibly even a composite.

A preferred length of the lever arm 82 would be in the range of 8-14 inches and a T-shaped handle 86 is preferably utilized. The handle 86 allows the user of the apparatus 10 to rotate the lever arm 82 and to increase or decrease compression upon the first and second balls 46, 60 within the respective upper and lower portions 56, 58 of the main housing 54. The lever arm 82 at the distal end 84 threadedly engages with the fastener 76 that is captured in the minor housing 78 formed within the central portion 74 of the main housing member 54.

As the lever arm 82 is rotated clockwise the fastener 76 causes the first and second housing members 70, 72 of the main housing 54 to be drawn tightly together increasing the compression upon the first and second balls 46, 60. The lever arm 82 may of course also be rotated counter-clockwise to decrease the compression upon the first and second balls 46, 60 thereby facilitating their extraction from the upper and lower portions 56, 58 of the main housing 54.

As best illustrated at FIG. 4, the lever arm 82 is highly functional because of its ability to not only rotate the apparatus 10 in a circular manner C in a horizontal plane but also to pivot P the apparatus 10 in a vertical plane allowing the user to easily optimize the orientation of the apparatus 10 and the fishing rods 19 to their needs. As previously noted, the user may rotate the T-handle 86 to decrease the compressive pressure upon the first and second balls 46, 60 by the respective upper and lower portions 56, 58 of the main housing 54. Next, the user can rotate C and/or pivot P the apparatus 10 to the desired orientation and then tighten the upper and lower portions 56, 58 to secure and the lock the apparatus 10 in position.

FIG. 3 illustrates an exemplary placement of the apparatus 10 near the gunnel 100 of a boat 102. The mounting member 62 of the second ball 60 may also be mounted, for example, to the deck, transom, or side rail 104 as illustrated at FIG. 4 with threaded fasteners 63. The mounting member at FIG. 4 is fastened to a U-shaped slider 106 that can translate along the side rail 104 of the boat 102. The fasteners 110 securing the U-shaped slider 106 are preferably manually adjustable allowing the U-shaped slider 106 to translate to a preferred position on the boat 102.

Figure 5:
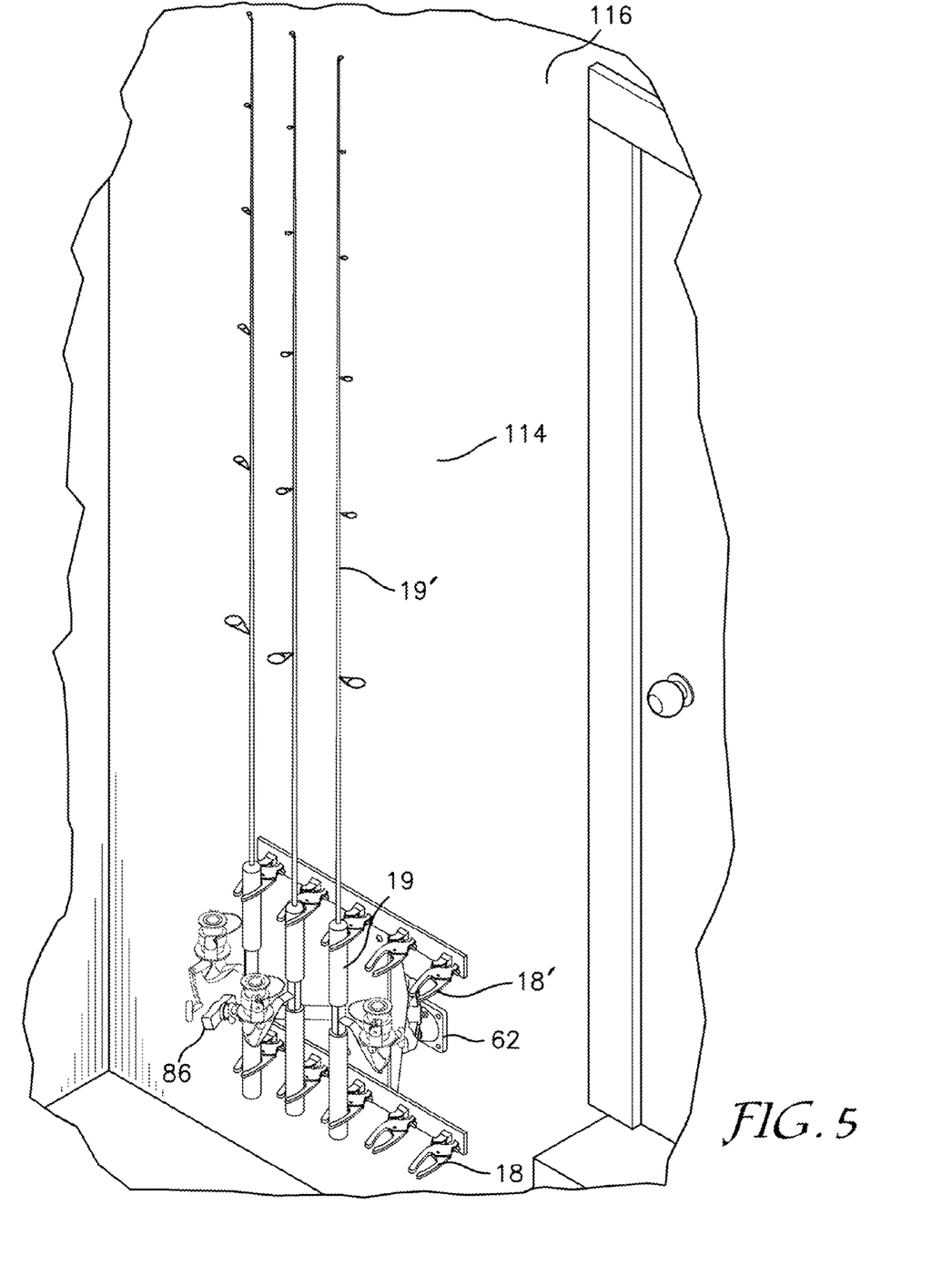
FIG. 5 illustrates a perspective view of an embodiment of the apparatus mounted to a vertical surface of a structure.

FIG. 5 illustrates an end of the fishing season utilization of the apparatus 10 or even when a boat clean out is being performed. Instead of moving the apparatus 10 onto the garage floor or onto the driveway where the apparatus and the fishing rods 19 secured thereto may be damaged by being stepped upon or inadvertently kicked, a second ball 60 with mounting member 62 may be mounted to a vertical surface such as a wall 114 of a garage or other storage area 116.

The disclosed apparatus should not be construed as limiting in any way. Instead, the present disclosure is directed toward all novel and nonobvious features and aspects of the various disclosed embodiments, alone and in various combinations and sub-combinations with one another. The disclosed apparatus is not limited to any specific aspect or feature or combination thereof, nor do the disclosed embodiments require that any one or more specific advantages be present, or problems be solved.

In view of the many possible embodiments to which the principles of the disclosed invention may be applied, it should be recognized that the illustrated embodiments are only examples of the disclosure and should not be taken as limiting the scope of the invention. Rather, the scope of the invention is defined by the following claims. We therefore claim as our invention all that comes within the scope of these claims.

The disclosure presented herein is believed to encompass at least one distinct invention with independent utility. While the at least one invention has been disclosed in exemplary forms, the specific embodiments thereof as described and illustrated herein are not to be considered in a limiting sense, as numerous variations are possible. Equivalent changes, modifications, and variations of the variety of embodiments, materials, compositions, and methods may be made within the scope of the present disclosure, achieving substantially similar results. The subject matter of the at least one invention includes all novel and non-obvious combinations and sub-combinations of the various elements, features, functions and/or properties disclosed herein and their equivalents.

Benefits, other advantages, and solutions to problems have been described herein regarding specific embodiments. However, the benefits, advantages, solutions to problems, and any element or combination of elements that may cause any benefits, advantage, or solution to occur or become more pronounced are not to be considered as critical, required, or essential features or elements of any or all the claims of at least one invention.

Many changes and modifications within the scope of the instant disclosure may be made without departing from the spirit thereof, and the one or more inventions described herein include all such modifications. Corresponding structures, materials, acts, and equivalents of all elements in the claims are intended to include any structure, material, or acts for performing the functions in combination with other claim elements as specifically recited. The scope of the one or more inventions should be determined by the appended claims and their legal equivalents, rather than by the examples set forth herein.

Benefits, other advantages, and solutions to problems have been described herein regarding specific embodiments. Furthermore, the connecting lines, if any, shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

In the detailed description herein, references to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described relating to an embodiment, it is submitted that it is within the knowledge of one skilled in the art to affect such feature, structure, or characteristic relating to other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention has been described above with reference to one or more preferred embodiments, it will be appreciated that various changes or modifications may be made without departing from the scope of the invention as defined in the appended claims.

We claim:

1. An apparatus for restraining fishing rods, the apparatus comprising:
    a base member with first and second ends and an upper and a lower surface;
    separate plate members respectively disposed proximate to and secured to the first end and second end of the base member;
    a plurality of clamps arranged for restraining at least one fishing rod, the clamps mounted against the upper surface of the plate members;
    a first ball with a mounting member, the mounting member extending outwardly from the bottom surface of the base member;
    a main housing with an upper portion and a lower portion, the upper portion for restraining movement about the first ball;
    a second ball with a mounting member configured to be secured to a boat;
    the upper portion forming a first socket for restraining movement about the first ball and the lower portion forming a second socket for restraining movement about the second ball;
    a central portion between the sockets defining an opening;
    a minor housing disposed within the central portion and retaining a threaded fastener in fixed relation; and
    an elongated lever arm with a distal and a proximal end, the lever arm extending outwardly from the main housing and having a threaded distal end that passes through the opening and threadably engages the threaded fastener, the lever arm being operable to increase or decrease compression upon both the first and second balls simultaneously and for rotating as well as pivoting the main housing, base member, and plate members to a desired orientation.

2. The apparatus of claim 1, wherein the main housing comprises a first and a second housing member.

3. The apparatus of claim 2, wherein the main housing comprises a central portion disposed between the first and second housing members.

4. The apparatus of claim 3, wherein the central portion comprises the minor housing disposed within the first housing member for receiving and retaining a threaded fastener.

5. The apparatus of claim 4, wherein the threaded distal end of the lever arm is received into the threaded fastener.

6. The apparatus of claim 4, wherein the mounting member of the second ball comprises a mounting bracket including a plate with through-holes and threaded fasteners for mounting to a plate disposed upon or within a deck of the boat.

7. The apparatus of claim 6, wherein the hardware for mounting to the deck or transom comprises threaded fasteners.

8. The apparatus of claim 1, wherein the central portion comprises an opening for insertion of the threaded distal end of the lever arm.

9. The apparatus of claim 1, wherein spring-loaded clamps are mounted atop the upper surfaces of the plate members.

10. The apparatus of claim 1, wherein rotation of the lever arm is operable to increase or decrease pressure applied to the first and second balls by the first and second housing members of the main housing.

11. The apparatus of claim 1, wherein the compressive force of each of the plurality of clamps is adjustable.

12. An apparatus for restraining fishing rods, the apparatus comprising:
a base member with first and second ends and an upper and a lower surface;
separate plate members respectively disposed proximate to and secured to the first end and the second end of the base member;
at least two clamps for restraining at least one fishing rod, the clamps mounted against the upper surface of the plate members;
a first ball with a mounting member, the mounting member extending outwardly from and secured to the bottom surface of the base member;
a main housing with an upper portion and a lower portion, the upper portion for rotatably restraining the first ball;
a second ball with a mounting member configured to be secured to a surface, the upper portion forming a first socket for restraining movement about the first ball and the lower portion forming a second socket for restraining movement about the second ball;
a central portion between the sockets defining an opening;
a minor housing disposed within the central portion and retaining a threaded fastener in fixed relation; and
an elongated lever arm with a distal and a proximal end, the lever arm extending outwardly from the main housing and having a threaded distal end that passes through the opening and threadably engages the threaded fastener, the lever arm being operable to increase or decrease compression upon both the first and second balls simultaneously and for rotating as well as pivoting the main housing, base member, and plate members to a desired orientation.

13. The apparatus of claim 12, wherein the surface comprises a wall of a structure.

14. The apparatus of claim 12, wherein the compressive holding power of the plurality of clamps is adjustable.

* * * * *